United States Patent [19]

Majima et al.

[11] 3,894,223

[45] July 8, 1975

[54] MAGNETIC BUBBLE DOMAIN LOGICAL AND ARITHMETIC DEVICES

[75] Inventors: Hideyasu Majima, Higashiyamato; Itsuo Mikami, Kodaira; Yuzo Kita, Kokbunji, all of Japan

[73] Assignee: Hitachi, Ltd., Japan

[22] Filed: Dec. 26, 1973

[21] Appl. No.: 428,036

Related U.S. Application Data

[63] Continuation of Ser. No. 181,757, Sept. 20, 1971, abandoned.

[30] Foreign Application Priority Data

Sept. 21, 1970 Japan ............................. 45-81972

[52] U.S. Cl. ................................ 235/175; 235/156

[51] Int. Cl. ............................................ G06f 7/50

[58] Field of Search .......... 235/175, 174, 173, 168, 235/156; 340/174 TF

[56] References Cited

UNITED STATES PATENTS

| | | | |
|---|---|---|---|
| 3,460,116 | 8/1969 | Bobeck et al. | 340/174 |
| 3,508,225 | 4/1970 | Smith | 340/174 |
| 3,541,522 | 11/1970 | Bobeck et al. | 340/174 X |

*Primary Examiner*—David H. Malzahn
*Attorney, Agent, or Firm*—Craig & Antonelli

[57] ABSTRACT

A logical operation processing device having an array of conductor loops of gold or like metal evaporated on the planar surface of a single crystal of a compound such as an orthoferrite whose easy axis of magnetization is normal to the planar surface. A bias field is applied normal to the planar surface of the crystal to hold magnetic bubbles and current is supplied through the conductor loops in a direction which will produce a reverse bias field so as to thereby reduce the strength of the bias field applied to the conductor loops and to produce a plurality of stable regions in which the magnetic bubbles can exist stably. A mobile field is applied to the array of the stable regions in such a manner that it traverses the array with time, and a magnetic bubble is injected into the stable region at one end of the array, so as to utilize the repulsion acting between the bubbles for carrying out logical operations including an AND operation, OR operation, flip-flop operation, addition, subtraction, multiplication, and space differentiation and integration.

13 Claims, 20 Drawing Figures

INVENTORS
HIDEYASU MAJIMA,
ITSUO MIKAMI
AND YUZO KITA
BY Craig, Antonelli & Hill
ATTORNEYS INVENTORS
HIDEYASU MAJIMA,
ITSUO MIKAMI
AND YUZO KITA
BY Craig, Antonelli & Hill
ATTORNEY INVENTORS
HIDEYASU MAJIMA,
ITSUO MIKAMI
AND YUZO KITA
BY Craig, Antonelli & Hill
ATTORNEYS INVENTORS
HIDEYASU MAJIMA,
ITSUO MIKAMI
AND YUZO KITA
BY Craig, Antonelli & Hill
ATTORNEYS

INVENTORS

HIDEYASU MAJIMA,
ITSUO MIKAMI
AND YUZO KITA

BY Craig, Antonelli & Hill
ATTORNEYS

INVENTORS
HIDEYASU MAJIMA,
ITSUO MIKAMI
AND YUZO KITA
BY Craig, Antonelli & Hill
ATTORNEYS INVENTORS
HIDEYASU MAJIMA
ITSUO MIKAMI
AND YUZO KITA
BY Craig, Antonelli & Hill
ATTORNEYS

MAGNETIC BUBBLE DOMAIN LOGICAL AND ARITHMETIC DEVICES

This is a continuation of application Ser. No. 187,757 filed Sept. 20, 1971, now abandoned.

BACKGROUND OF THE INVENTION

1. Field of the Invention

This invention relates to logical operation processing devices in which the fact that cylindrical domains are caused to move in response to the application of a mobile field while repelling each other is utilized so as to carry out various logical operations including an AND operation, OR operation, flipflop operation, addition, subtraction, multiplication, and space differentiation and integration.

2. Description of the Prior Art

When a magnetic field is applied normal to the planar surface of a single-crystalline platelet of orthoferrites of general formula $RFeO_3$ (where R is any rare earth or yttrium) or of garnet in which the easy axis of magnetization runs normal to the planar surface, cylindrical domains (hereinafter to be merely referred to as bubbles) produced on the surface can be held on such surface. The method of producing the bubbles will be described later. This bubble appears in the form of a serpentine strip when a weak bias field is applied, and it disappears when a strong field is applied. As the strength of the bias field is gradually reduced, the diameter of the bubble is increased to an extent that the maximum diameter is about three times the minimum diameter.

The bubbles on the same orthoferrite platelet repel each other. Therefore, two bubbles cannot exist stably within a certain range. The spacing that allows the stable existence of the bubbles is determined by the relation between the repellent force and the coersive force Hc of the material. In the case of orthoferrites, this spacing is about four times the diameter of the bubbles.

A uniform field does not move the position of the bubble. The bubble is attracted to move from its position only when a non-uniform field is applied. Thus, the bubble is attracted or repelled by a local magnetic charge. When the strength of the bias field is reduced locally, the bubble moves in a position which is stable therefor. Therefore, the bubble can be moved to a specific stable position when a conductor array is disposed on the surface of the crystal and d.c. current is supplied so as to produce a reverse bias field. Alternatively, when a material such as permalloy having a high permeability is evaporated on the surface of the crystal, the bubble moves to a stable position at which it is in contact with the evaporated metal.

Such a bubble is very stable and does not disappear unless special means is applied externally. Methods for producing the bubble include a method in which a seed domain is employed to produce a bubble by the replica method using a conductor array, and a method in which a disc or T-bar of permalloy is deposited on the crystal surface and the bubble existing at one end of the permalloy disc is utilized. Methods of clearing, the bubble include a method in which a locally strong bias field is produced by supplying large current through a conductor array thereby clearing the bubble, and a method in which a bubble is forced into a domain existing at one end of a permalloy disc.

Means for causing the motion of the bubble while controlling the bubble include a conductor array, a permalloy T-bar array and a triangular permalloy array.

The first means employs an array of conductor loops for producing a mobile field in a direction normal to the orthoferrite platelet. The second means utilizes the properties of the bubble such that it is attracted and repelled by a magnetic charge. The third means utilizes the properties of the bubble such that its size is varied in response to the variation of a bias field and it is moved to a stable position in contact with the permalloy.

The bubble produced in the orthoferrite can be shifted to any desired position by the methods above described. The manner of shifting can be broadly classified into two types, that is, a type which utilizes the fact that the diameter of the bubble is a function of the strength of an applied bias field, and a type which utilizes the fact that the bubbles of the same polarity repel each other.

i. Shift utilizing the fact that the diameter of the bubble is a function of the bias field As described previously, the bubble produced in a region has such a property that its diameter is reduced with the increase in the strength of an applied bias field, and its diameter is increased with the reduction in the strength of the applied bias field. The first and third means described above utilize this property of the bubble.

ii. Shift utilizing the polarity of the bubble

This shifting method utilizes the fact that a bubble portion on a bubble element has a polarity opposite to that of the remaining portion of the element, and the bubbles are of the same polarity. Known shifts utilizing the polarity of the bubble include a T-bar shift as above described and a Y-bar shift.

SUMMARY OF THE INVENTION

It is a primary object of the present invention to provide various logical operation processing devices utilizing the motion of the bubbles.

Another object of the present invention is to provide devices of the above character which utilize the shift by means of an array of conductor loops as described previously and the repulsion between the bubbles.

BRIEF DESCRIPTION OF THE DRAWING

FIGS. 114*a* and 14*b* are circuit diagrams of switching means used in the space integrator shown in FIG. 13.

DESCRIPTION OF THE PREFERRED EMBODMENTS

As described generally, the preent invention utilizes the shift by the conductor loop array and the forced shift due to the repellent force acting between the bubbles.

Shift by the conductor loop array.

Figure 1A:
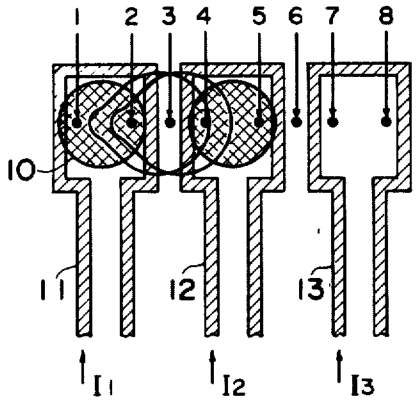
FIGS. 1*a* and 1*b* are diagrammatic views illustrating the manner of shifting by means of an array of conductor loops.
Figure 1B:
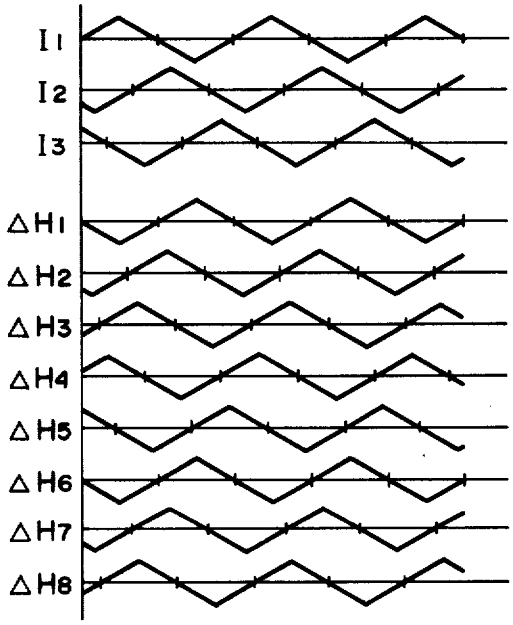

FIG. 1*a* shows the motion of a bubble on three conductor loops evaporated on the surface of an orthoferrite or like crystal. The reference numerals 1 to 8 designate the check points for checking a variation of the field normal to the planar surface of the crystal. The bubble is designated by the reference numeral 10 and the conductor loops evaporated on the surface of the crystal are designated by the reference numerals 11, 12 and 13. The three conductor loops 11, 12 and 12 are supplied with alternating currents $I_1$, $I_2$ and $I_3$ respectively which are $\frac{2}{3}\pi$ out of phase from each other. FIG. 1*b* shows the waveforms of the currents $I_1$, $I_2$, $I_3$ and the variations ΔHi of the magnetic field at the respective check points. It is assumed in FIG. 1*b* that the variation ΔHi of the field is zero in the state in which a bias field is applied, and the variation ΔHi goes negative as the strength of the bias field is increased, while it goes positive as the strength of the bias field is decreased.

Referring to FIGS. 1*a* and 1*b*, the bubble 10 in the conductor loop 11 is attracted while being deformed in such a manner that its diameter is increased successively from the point at which $\Delta H_1$ is negative toward the point at which $\Delta H_1$ is positive. The diameter of the bubble 10 becomes maximum at the point 3. At the points 2 and 4 which are symmetrical to each other, $\Delta H_2 = 0$ and $\Delta H_4 > 0$, and therefore the bubble 10 moves further rightward. When the bubble 10 moves past the point 3, the diameter of the bubble 10 is gradually reduced and the bubble 10 moves into the conductor loop 12. When $\Delta H_4 \doteq \Delta H_5$, the bubble 10 is situated at the center of the conductor loop 12. It will be understood that the bubble 10 is shifted from the conductor loop 11 to the conductor loop 12 during the first half cycle and is similarly shifted from the conductor loop 12 to the conductor loop 13 during the next half cycle.

Forced shift

Bubbles are of the same polarity, and therefore, they repel each other. Two bubbles cannot exist stably within a distance of less than four times the bubble diameter unless a biasing means is used. Suppose, for example, that a plurality of cells are disposed in parallel with each other with a spacing equal to four times the bubble diameter. These cells may, for example, be conductor loops as above described. When bubbles are trapped within all these cells and a bubble is externally forced into the input cell by applying energy thereto, the bubbles existing stably within the cells are shifted toward the output side one by one by the repellent force acting therebetween until a stable state is reached again for each bubble. The bubble in the stable state may be considered to represent one bit in the binary system. The input energy applied to the bubble for forcing it into the input cell must be larger than the sum of the energies required for shifting by one bit position the bubbles existing stably in the cells. This method of shifting differs from the other method of shifting described above in that the serial pattern is subject to a change unless bubbles exist within all the cells. In other words, if the serial pattern includes a cell in which no bubble exists, the motion of the bubbles due to repulsion does not occur in that cell position and the shift toward the bit positions following this empty cell is interrupted.

The shifting operation in the present invention utilizes principally the combination of the two methods above described, this combination being referred to herein as a combined shift. The practical operation of the combined shift will be described with reference to FIG. 2.

Figure 2:
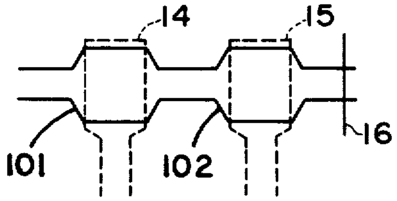
FIG. 2 is a diagrammatic view illustrating the basic shifting operation according to the present invention.

FIG. 2 shows a two-input AND gate which is a simplest form of a logical operation device. This gate comprises two cells 101 and 102 connected laterally on the upper surface and two longitudinally extending input loops 11 and 15 arranged for setting a bubble in each cell. Suppose now that both the cells 101 and 102 are in the state "1" due to the fact that the cells 101 and 102 are filled with bubbles. Suppose further that a triggering bubble is applied to the circuit from the trigger input at the left-hand end of the cell 101. Since the bubbles have been already set in both the cells 101 and 102, one bubble is forced out of the output end of the cell 102 by the repellent force acting between the bubbles. This bubble is detected by a signal detecting means 16 so that the output is 1. When at least one of the cells 101 and 102 is not filled with the bubble and a triggering bubble is applied from the trigger input in such a state of the circuit, the empty cell buffers the repulsion between the bubbles and no bubble is detected by the signal detecting means 16. In this case, the output is 0.

Preferred embodiments of the present invention will now be described in detail.

1. Flip-flop

Figure 3A:
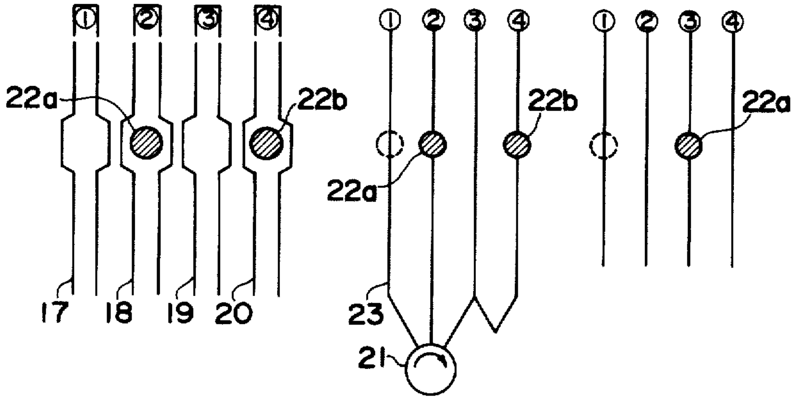
FIGS. 3*a* and 3*b* are diagrammatic views illustrating the operation of flip-flops embodying the present invention.

FIG. 3*a* shows diagrammatically the structure of a bubble triggered flip-flop. The reference numerals 17 to 20 designate conductor loops. The reference numeral 23 designates also the conductor loop 17 which is, however, shown in the form of a single line. Hereinafter, the conductor loops 17, 18, 19 and 20 will be referred merely to as lines①,③,③and④respectively. Therefore, a bubble on line 23 indicates the bubble in the cell formed by the conductor loop 17. The lines② ,③and④are arranged in parallel with each other and are spaced from each other so that the repellent force acting between two bubbles existing on two adjoining lines may be slightly larger than the strength of the trapping field applied to each line. A power supply 21 for producing a mobile field is connected to the lines ①,②and③for causing the motion of bubbles 22*a* in the right-hand direction. The bubble is detected by a detector (not shown) fixedly mounted on the line ③ so that the presence and absence of the bubble on the line ③ are detected as 1 and 0 respectively. When the line ③ is in the state 0, the bubble on the line ② is shifted unhindered to the line ③ and the state of the line ③ is inverted from 0 to 1. The bubble cannot exist simultaneously on the two adjoining lines. Therefore, when both the lines ② and ③ are in the state 1, the bubbles on these lines ② and ③ repel each other so that the bubble on the line ③ is shifted to the line ④ while the bubble on the line ② is not shifted and remains on the line ②. Thus, the state of the line ③ is inverted from 1 to 0 in response to the input. The operation for carrying out such a shift is classified into so-called one-step operation and two-step operation.

According to the one-step operation, a mobile field is applied to the lines ① to ③ and a bubble injected into the line ① is shifted to the line ③ by one step. When no bubble exists on the line ③ in this case, the bubble is shifted unhindered to the line ③, while when a bubble exists on the line ③ the bubble existing on the line ③ is forced toward the line ④ and the bubble moving toward the line ③ is not shifted any further and remains on the line ②. Thereafter, the strength of the field applied to the line ④ may be reduced as required so as to lock the bubble shifted to the line ④.

According to the two-step operation, a first mobile field is applied to the lines ① and ②, and a second mobile field of less strength is applied to the lines ② and ③. At first, a bubble on the line ① is shifted to the line ② by the first mobile field. When, in this case, a bubble exists on the line ③, this bubble is forced out to be shifted to the line ④. In order to further ensure this operation, the weak mobile field is utilized to shift the bubble on the line ② to the line ③. However, when a bubble exists on the line ④, the bubble tending to shift to the line ③ is repelled so that it remains on the line ②, while when no bubble exists on the line ④, the bubble on the line ② is shifted to the line ③ unhindered. It will be understood that the line ③ remains in the state 0 when a bubble forced out by the first mobile field exists on the line ④, while the state of the line ③ is inverted to 1 in response to the application of the second mobile field in the case in which no bubble exists on the line ④ In this case too, the strength of the field applied to the line ④ may be reduced as required to lock the bubble on the line ④.

More precisely, the bubble triggered flip-flop operates in a manner as described below.

I i. A three-phase current is applied to reduce the strength of the field applied to the lines so as to apply a mobile field for shifting a bubble 22*a* from the line ① to the line ③. (In the case of the two-step operation, the bubble 22*a* is shifted first from the line ① to the line ② and then from the line ② to the line ③.)

II i. When no bubble exists on the line ④, the bubble 22*a* is shifted to the line ③ so that the state of the line ③ is inverted from 0 to 1. When the line ③ is initially in the state 1, the bubble 22*b* on this line ③ is forcedly shifted to the line ④ by the bubble 22*a* so that the bubbles 22*a* and 22*b* exist stably on the lines ② and ④ respectively. In this case, therefore, the state of the line ③ is inverted from 1 to 0.

III i. A strong field is applied to the lines ② and ④ to clear the bubbles 22*a* and 22*b*.

The above description has referred to the structure and operation of a flip-flop utilizing a mobile field and repulsion between two bubbles. However, a flip-flop relying principally on the repulsion between two bubbles may be obtained.

Figure 3B:
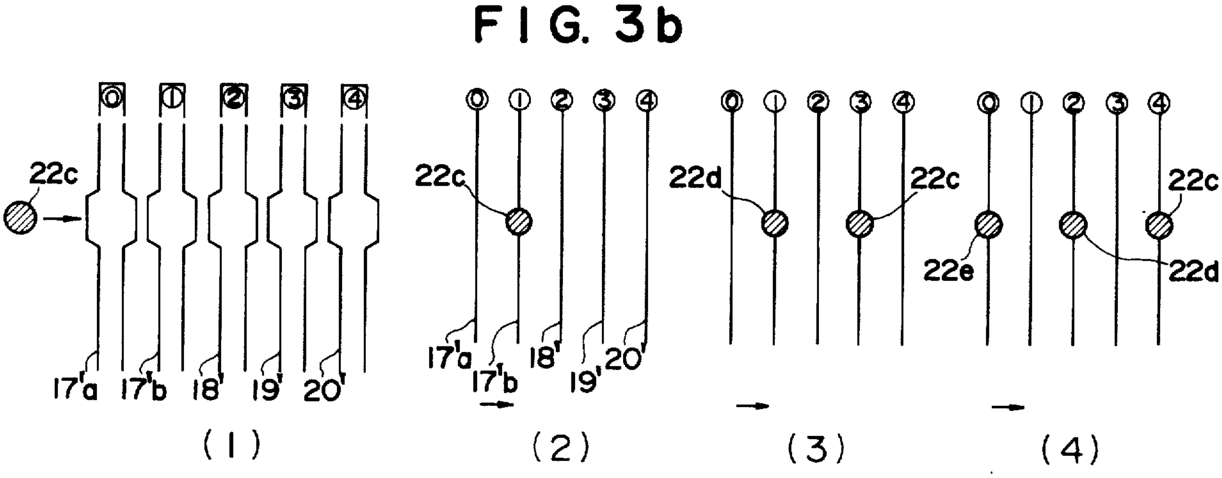

FIG. 3*b* shows diagrammatically the structure of such a flip-flop. Referring to FIG. 3*b*, the reference numerals 17′*a*, 17′*b*, 18′, 19′ and 20′ shown in (1) designate conductor loops, and similar conductor loops are shown by single lines in (2), (3) and (4). The conductor loops 17′*a* and 17′*b* correspond to the conductor loop 17 shown in FIG. 3*a*. Similarly, the conductor loops 18′, 19′ and 20′ correspond to the conductor loops 18, 19 and 20 shown in FIG. 3*a* respectively. In the flip-flop shown in FIG. 3*b*, no mobile field is required for the loops 17′ to 19′. The loops 18′, 19′0 and 20′ are operation loops, and the loops 17′ are triggering loops for applying a triggering bubble to the operation loop 18′. A bubble introducing field of suitable strength greater than that of the trapping field is applied in a direction of from the loop 17′*a* or line ⓪ toward the loop 17′*b* or line ①. When now a bubble 22*c* is injected into the line ⓪, this bubble 22*c* is shift to the line ① by being forced by the bubble introducing field in a direction as shown by the arrow. This state is shown in (2) of FIG. 3*b*. The conductor loop 19′ or line ③ is in the state 0 since no bubble exists thereon. Then, when a triggering bubble 22*d* is injected into the line ⓪, the bubble 22*c* is repelled by the bubble 22*d* to be shifted to the conductor loop 18′ or line ② (not shown). At the next moment, the bubble 22*d* is shifted to the line ① by being forced by the bubble introducing field, and the bubble 22*c* on the line ② is repelled by the bubble 22*d* to be shifted to the line ③ as shown in (3) of FIG. 3*b*. As a result, the state of the line ③ is inverted from 0 to 1. In response to the further application of a triggering bubble 22*e*, the bubble 22*d* on the line ① is repelled by the bubble 22*e* to be shifted to the line ②, and the bubble 22*c* on the line ③ is repelled by the bubble 22*d* to be shifted to the conductor loop 20′ or line ④ as seen in (4) of FIG. 3*b*.

Saturation is established thereby and the bubble 22*e* would not be shifted to the line ①. Therefore, the state of the line ③ is inverted from 1 to 0 again. Subsequently, a bubble clearing field of substantial strength is applied to the lines ② and ④ to clear the bubbles thereon. It will be understood that the bubbles on the operation loops are cleared each time the state of the line ③ is inverted from 1 to 0. The bubble triggered flip-flop operates in this manner while repeating the above operation.

2. AND circuit

Figure 4A:
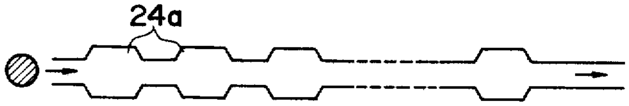
FIGS. 4*a* and 4*b* are diagrammatic views illustrating the operation of AND gates embodying the present invention.
Figure 4B:
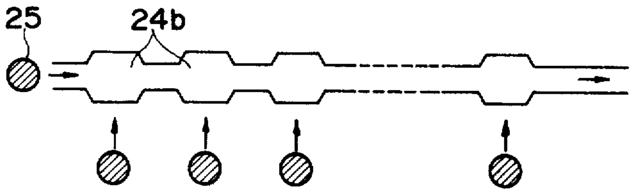

FIGS. 4*a* and 4*b* show AND circuits comprising *n* cells 24*a* and 24*b* arranged successively in one direction, respectively. The cells 24*a* and 24*b*, respectively, are spaced from each other by a minimum distance at which bubbles can be locked in position while overcoming the repellent force acting therebetween.

FIG. 4*a* shows diagrammatically the structure of an AND circuit having a single input to which a train of *n* bubbles are continuously applied. The bubbles are applied continuously and are continuously shifted toward the output side by the repellent force acting therebetween so that the first bubble of the *n* bubbles applied, continuously to the input is delivered from the output in response to the subsequent application of a timing bubble. When an output appears, all the bubbles are cleared. The number *n* corresponds to the so-called fan-in and has a certain limit depending on the bias field, line current and configuration of the line.

FIG. 4$b$ shows diagrammatically the structure of an AND circuit having $n$ parallel inputs. In this structure, $n$ bubbles are simultaneously applied to the circuit and an output appears in response to the application of a timing bubble 25 from the left-hand end of the circuit. In this circuit, no output appears when anyone of the inputs is not applied, and clear current is supplied for clearing all the bubbles immediately after the application of the timing bubble 25.

3. OR circuit

Figures 5B, 6:
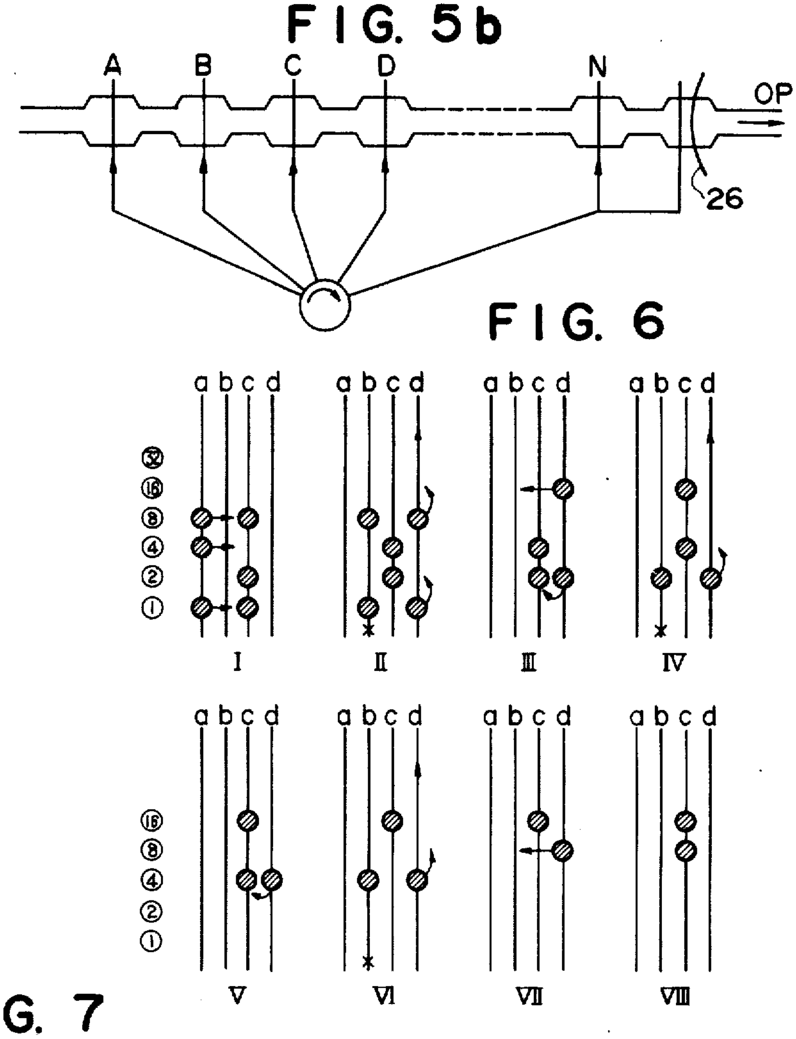
FIGS. 5*a* and 5*b* are diagrammatic views illustrating the operation of OR gates embodying the present invention.
FIG. 6 is a diagrammatic view illustrating the operation of an adder embodying the present invention.
Figure 5A:
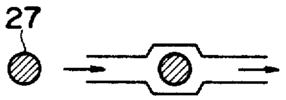

FIG. 5$a$ shows diagrammatically the structure of an OR circuit having a single input to which a train of $n$ bubbles are applied. According to this structure, an output appears in response to the application of a timing bubble to the input at the left-hand end of the circuit when a bubble exists in the circuit.

FIG. 5$b$ shows diagrammatically the structure of an OR circuit having $n$ inputs. The reference numeral 26 designates a sensing means which may be a Sony magneto-diode (SMD) or Hall element. A mobile field is applied to lines A, B, - - - N. Therefore, an input applied to any one of the lines is successively shifted by the mobile field until finally it is sensed by the sensing means 26. The lines A, B, - - - N are in the form of conductor loops as shown in FIG. 3$a$.

A plurality of flip-flops may be arranged in parallel with each other and operated to carry out the arithmetic operations between trains of bubbles carrying binary information. This manner of arithmetic operations is called herein a line operation since the bubbles on a plurality of lines are repeatedly shifted from line to line and from one position to another on the lines.

4. Line addition

FIG. 6 illustrates the manner or line addition according to the present invention, and conductor loops are shown by single lines as before. Lines $a$, $b$, $c$ and $d$ shown in I of FIG. 6 are an input (addend) line, a carry line, a sum line and a carry processing line respectively. Bubbles arranged longitudinally on each line in the direction of the line represent binary information and are weighted by 1, 2, 4, 8, 16, - - 84 from below. Suppose now that the addition $11 + 13 = 24$ is carried out. The input or addend is applied to the line $a$ and is, in this case, 13 as seen in I of FIG. 6. The augend and the sum appear on the line $c$. The augend, in this case, is 11 as seen in I of FIG. 6. The sum is 24 as seen in VII of FIG. 6. The method of addition according to the present invention will be described in detail by taking the above addition as an example. In FIG. 6, the arrow shows a shift and the symbol X shows a clear.

I i. The addend 13 is set on the line $a$. The augend 11 has been set on the line $c$.

ii. A mobile field is applied in such a direction that it moves from the line $a$ to the line $c$. The bubbles on the line $a$ are shifted to the line $c$ when no bubbles exist in the corresponding bit positions. When the bubbles exist on the lines $a$ and $c$ in the corresponding bit positions, the bubbles repel each other so that the bubbles on the line $a$ are shifted to the line $b$, while the bubbles on the line $c$ are shifted to the line $d$.

iii. When no bubbles exist on the line $b$, the computation is completed and the sum appears on the line $c$.

II i. The bubbles on the line $b$ are cleared and the bubbles on the line $d$ are carried by one bit position. (However, the lines $b$ and $d$ may be operated in the manner contrary to the above operation.)

III i. The bubbles on the line $c$ becomes unstable when the bubbles exist on the lines $c$ and $d$ in the same bit positions.

ii. The bubbles are shifted from the line $d$ to the line $c$ for addition. (One of the bubbles existing on the line $c$ is forcedly shifted to the line $b$ and the corresponding bubble on the line $d$ is repelled back to the line $d$ by the repellent force acting between the bubbles. When no bubbles exist on the line $c$, the bubbles on the line $d$ are shifted to the line $c$.)

iii. When no bubbles exist on the line $b$, the computation is completed and the sum appears on the line $c$.

IV i. The bubble on the line $b$ is cleared and the bubble on the line $d$ is carried by one bit position.

V i. The bubble on the line $d$ is shifted to the line $c$ for addition. Subsequent operation is similar to that described in III (ii) and (iii).

VI i. The bubble on the line $b$ is cleared and the bubble on the line $d$ is carried by one bit position.

VII i. The bubble on the line $d$ is shifted to the line $c$. When, in this case, the bubbles exist on the lines $c$ and $d$ in the same bit position, the bubble on the line $c$ is shifted to the line $b$.

VIII i. When no bubbles exist on the line $b$, the computation is completed and the sum appears on the line $c$.

5. Line subtraction

Figure 7:
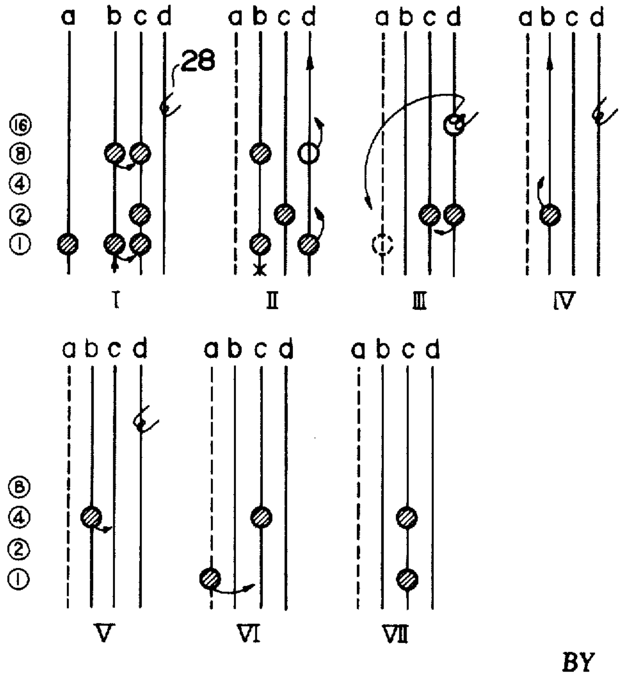
FIG. 7 is a diagrammatic view illustrating the operation of a subtractor embodying the present invention.

FIG. 7 illustrates the manner of line subtraction according to the present invention, and conductor loops are shown by single lines as before. In the illustrated form, a bubble detector 28 and an electrical circuit (not shown) for temporarily holding the output are especially provided. The bubble detector 28 in FIG. 7 is a magnetic detector of high sensitivity such as, for example, a Sony magneto-diode (SMD), and is disposed at a position capable of detecting a carry to the bit position having the weight 16 on a line $d$. A line $a$ is a replicating line which replicates 1 only when a shift to the bit position of the weight 16 occurs on the line $d$. A subtrahend is set on a line $b$, and a minuend and the difference are set on a line $c$. Suppose now that the subtraction $11 - 6 = 5$ is carried out. In this case, the subtrahend is $-6$ and the minuend is 11. However, actually, 9 is set on the line $b$ since the complementing method using a complement for 15 is employed in FIG. 7. The manner of subtraction according to the present invention will be described in detail by taking the above subtraction as an example.

I i. The subtrahend $-6$ (actually, $15 - 6 = 9$) is set on the line $b$. The minuend 11 has been set on the line $c$.

ii. The bubbles on the line $b$ are shifted to the line $c$.

iii. The computation is completed when no carry occurs on the line $d$.

II i. The bubbles on the line $b$ are cleared and the bubbles on the line $d$ are carried by one bit position.

III i. When an output is detected by the detector 28, a record is made in a memory (not shown) so that the first bit on the line $a$ be shifted in the final stage.

ii. A mobile field is applied for shifting the bubble on the line $d$ to the line $c$. When a bubble exists on the line $c$, the bubble is shifted to the line $b$ and the bubble on the line $d$ would not be shifted. When no bubble appears on the line $b$ in this case, operation proceeds to the step VI.

IV i. The bubble on the line $b$ is carried by one bit position and the bubble on the line $d$ is cleared.

V i. The bubble on the line $b$ is shifted to the line $e$. When a bubble appears on the line $d$ in this case, the bubble on the line $d$ is carried by one bit position and the bubble on the line $b$ is cleared.

VI. i. The bubble in the bit position having the weight 1 on the line $a$ is shifted to the line $c$.

VII i. The computation is completed and the difference appears on the line $c$. When no bubble has been detected by the detector 28, this means that the answer is negative or zero, and the negative or zero answer appears on the line $c$ in the form of the complement for 15.

6. Line multiplication

Figure 8:
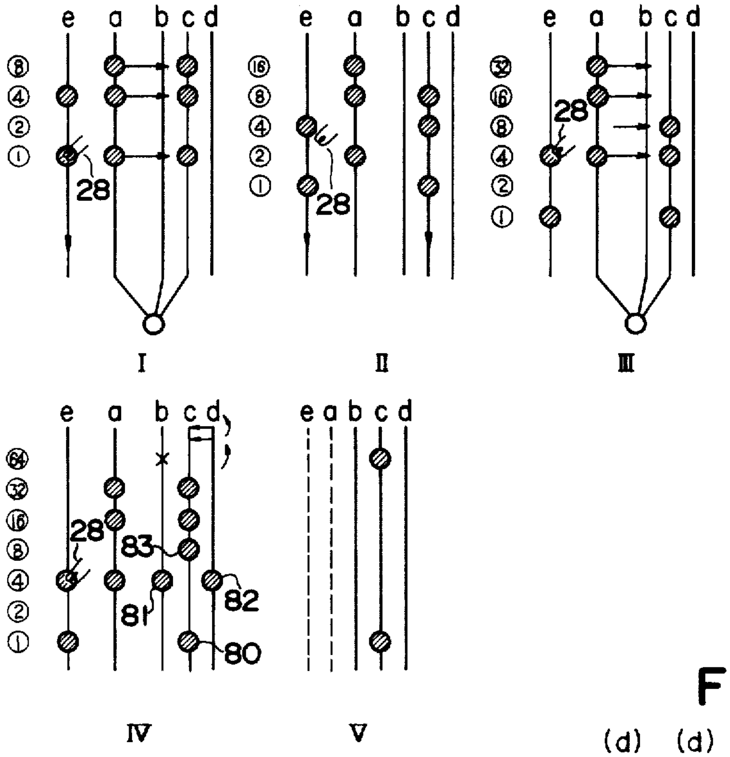
FIG. 8 is a diagrammatic view illustrating the operation of a multiplier embodying the present invention.

FIG. 8 illustrates the manner of line multiplication according to the present invention, and conductor loops are shown by single lines as before. The illustrated device comprises one replicating line $e$ and four lines $a$, $b$, $c$ and $d$. The line $e$ is associated with a stationary detector 28 for detecting 1 and 0 of binary notation in a multiplier. Each time 1 is detected by the detector 28, a multiplicand is replicated on the line $b$ and bubbles on the lines $e$ and $c$ are shifted to the next lower bit positions. When 0 is then detected by the detector 28, the bubbles on the lines $e$ and $c$ are further shifted to the next lower bit positions from the shifted positions. The manner of line multiplication will be described in detail by taking the multiplication $5 \times 13 = 65$ as an example.

I i. The multiplier 5 is set on the line $e$, while the multiplicand 13 is replicatably set on the line $a$.

ii. The detector 28 detects 1. Thus, the bubbles on the line $a$ are shifted to the line $c$, while at the same time, these bubbles are replicated on the line $a$.

iii. The bubbles on the lines $e$ and $c$ are shifted to the next lower bit positions.

II. i. The detector 28 detects 0. Thus, the bubbles on the lines $e$ and $c$ are shifted further to the next lower bit positions III i. The detector 28 detects 1. Thus, the bubbles on the line $a$ are replicated to be shifted to the line $c$.

IV i. The shifting of the multiplier has been completed and now the carry operation is solely carried out. Shifting, clearing and addition are repeated until no carry occurs.

More precisely, the bubble 82 on the line $d$ is carried to the bit position having the weight 8 and in added to the bubble 83 on the line $c$. The bubble 83 is repelled by the bubble 82 and is shifted to the line $d$, while the bubble 82 is repelled back to the line $d$. The line $b$ is cleared. This operation is carried out until no carry occurs. The completion of the carry operation is detected in a manner as described below. When the bubble 82 on the line $d$ is shifted to the line $c$ for the purpose of addition and no bubble exists in the same bit position on the line $c$, the bubble 83 exists stably on the line $c$. Therefore, the carry operation is completed when no output appears due to the fact that no bubble exists on the line $d$ during addition.

V i. The carry operation is completed and the answer 65 appears on the line $c$.

7. Binary counter

Figure 9:
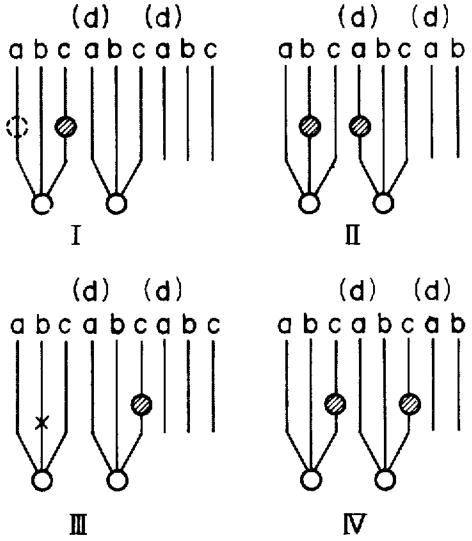
FIG. 9 is a diagrammatic view illustrating the operation of a binary counter embodying the present invention.

FIG 9 illustrates the operation of a binary counter according to the present invention, and conductor loops are shown by single lines as before. This counter comprises a series connection of a plurality of bubble triggered flip-flops as described previously. As seen in FIG. 9, the structure of the binary counter is such that the line $d$ of a first bubble triggered flip-flop is connected in common with the line $a$ of a second bubble triggered flip-flop and the line $d$ of the second flip-flop is connected in common with the line $a$ of a third bubble triggered flip-flop. The operation of the binary counter having such a structure will be briefly described.

I i. A bubble appearing on the line $a$ of the first flip-flop is shifted to the line $c$ of the same flip-flop.

II i. A bubble appearing subsequently on the line $a$ of the first flip-flop is shifted toward the line $c$ of the same flip-flop.

ii. The bubbles repel each other so that the bubble existing initially on the line $c$ of the first flip-flop is shifted to the line $a$ of the second flip-flop, while the bubble moving toward the line $c$ of the first flip-flop is not shifted and remains on the line $b$ of the first flip-flop.

III i. The bubble on the line $b$ of the first flip-flop is cleared and the bubble on the line $a$ of the second flip-flop is shifted to the line $c$ of the same flip-flop.

ii. Similar operation is repeated.

Figure 10:
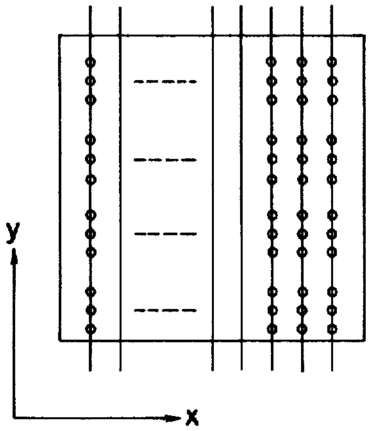
FIG. 10 is a diagrammatic view illustrating the operation of a two-dimensional function processor embodying the present invention.

FIG. 10 shows one form of a binary display of a two-dimensional function on an orthoferrite platelet. With such a structure, an operation such as differentiation or integration of a two-dimensional function making computation in the $x$ direction first and then in the $y$ direction. In the case of a three-dimensional function, indices in the $z$ direction may be added to the partial blocks of the two-dimensional function. For the sake of simplicity, computation of a unidimensional function will be described.

8. Space integration (simultaneous parallel addition for integration)

Figure 11:
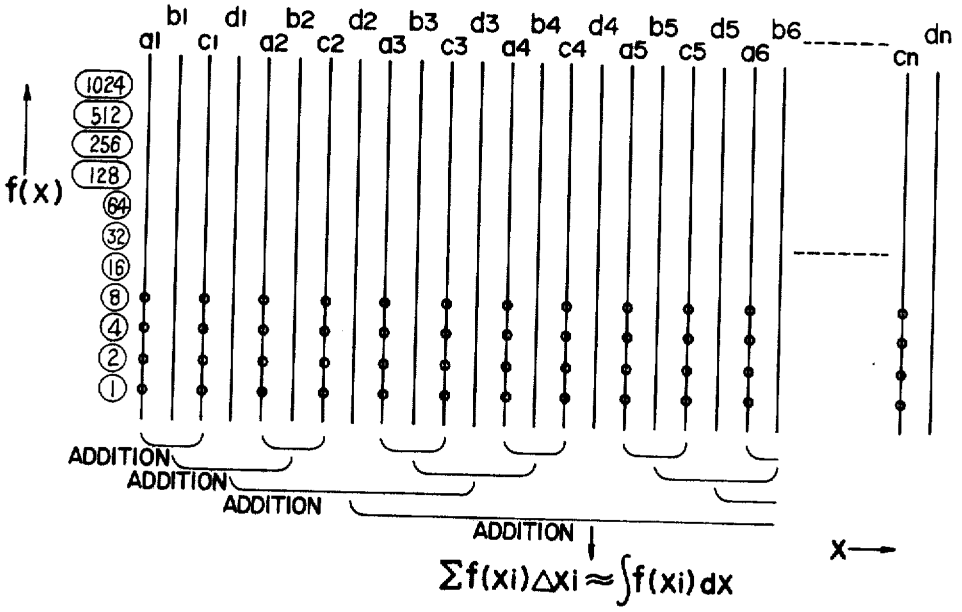
FIG. 11 is a diagrammatic view illustrating the manner of space integration according to the present invention.

FIG. 11 illustrates the manner of operation for space integration. As seen in FIG. 11, a multiplicity of adding lines are disposed in parallel with each other for storing a function $f(x)$ therein. More precisely, the function $f(x)$ is sampled at intervals of $\Delta x$ and the binary coded values of $f(x)$ are stored. For the sake of simplicity only, the bit positions representing the function $f(x)$ which is constant are shown in FIG. 11. The vertical axis represents the value of $f(x)$ and the horizontal axis represents the value of $x$. Due to the fact that $\int f(x)dx \approx \Sigma f(xi)\Delta xi$, integration can be attained by successive addition. In order to increase the speed of addition, the addition is carried out in a pyramidal fashion as shown.

The operation will now be described briefly. In FIG. 11, $n = 2^k$.

I First step of addition: For $a$ which is given by $i = 1, 2, \cdots n$;

i. The contents of the lines $a_i$ are added to the contents of the lines $c_i$ and the results are recorded on the lines $c_i$.

II. Second step of addition: For $i$ which is given by $i_{2m-1}$ ($m = 1, 2, \cdots n/2$);

i. The contents of the lines $c_i$ are shifted rightward to the lines $a_{i+1}$, and ii. The contents of the lines $a_{i+1}$ are added to the contents of the lines $c_{i+1}$ and the results are recorded on the lines $c_{i+1}$.

III Third step of addition: For $i$ and $j$ which are given by $i = 2m$ and $j = 4\ m$ ($m = 1, 2, \cdots$);

i. The contents of the lines $c_i$ are shifted rightward to the lines $a_j$, and ii. The contents of the lines $a_j$ are added to the contents of the lines $c_j$ and the results are recorded on the lines $c_j$.

K K-th or final step of addition: For $i$ and $j$ which are given by $i = 2^{k-1}$ and $j = 2^k$;

i. The contents of the line $a_1$ are shifted rightward to the line $a_j$, and ii. The contents of the line $a_j$ are added to the contents of the line $c_j$ and the results are recorded on the line $c_j$, the results giving the desired integrated value.

A practical structure embodying the manner of space integration above described will be described in detail later.

9. Space differentiation (simultaneous parallel subtraction for differentiation)

Due to the fact that $\Delta f(x_i) = f(x_i + 1) - f(x_i)$ a multiplicity of line subtractors may be disposed in parallel with each other and the difference between the values of a function $f(x)$ in the adjoining lines may be successively computed to obtain the differentiated value of the function $f(x)$.

Figure 12:
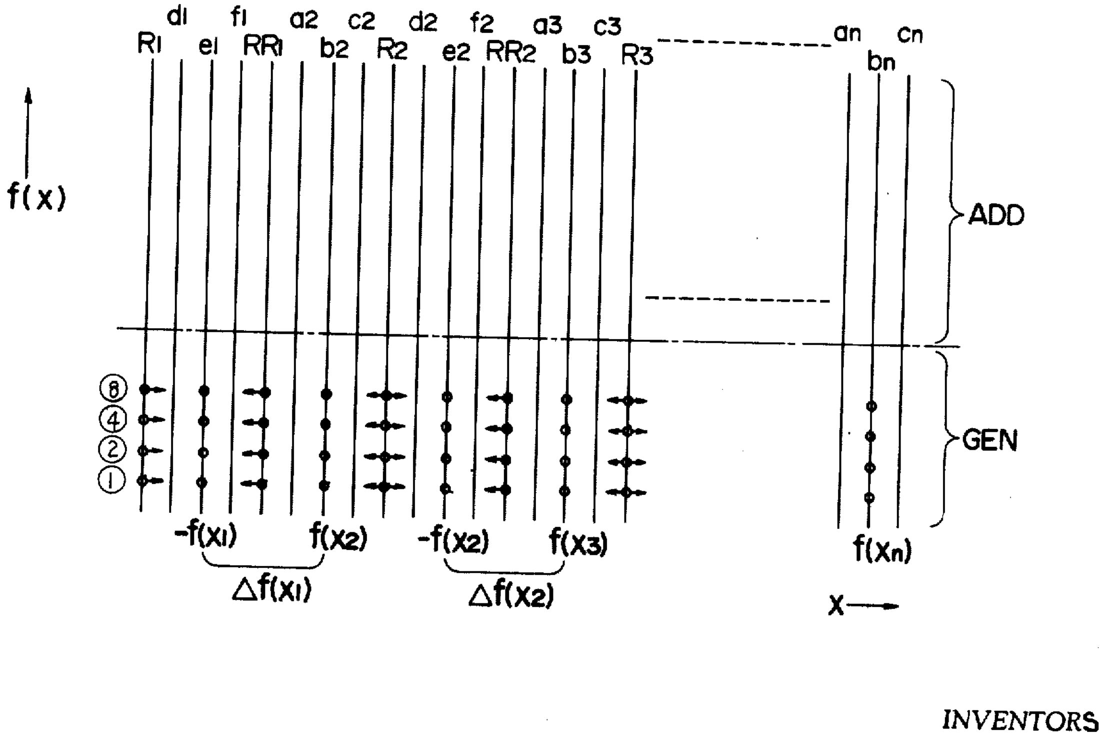
FIG. 12 is a diagrammatic view illustrating the manner of space differentiation according to the present invention.

FIG. 12 illustrates the manner of space differentiation according to the present invention. A first region ADD is a region in which simultaneous parallel addition is carried out, and a second region GEN is a function generating region. In FIG. 12, dots represent bubbles and the block dots among them show the fact that the bubbles exist always in those positions, meaning that these positions are in the state 1. For convenience of explanation, the bubbles exist up to the bit position having the weight 8, but it is apparent that the positions at which the bubbles exist are variable depending on the function $f(x)$. In the second region GEN, functions $f(x_i)$. In the second region Gem, functions $f(x_i)$ and $-f(x_i)$ are produced where $i = 1, 2, \cdots n$. Since $-f(x_i)$ is an inversion of $f(x_i)$, the bubbles on the lines $RR_i$ which are always in the state 1 may be added to the functions $f(x)$ on the lines $R_i$ to obtain $-f(x_i)$ on the lines $e_i$.

The operation will now be described briefly.

I First step: Setting of the functions $f(x_i)$ i. The functions $f(x_i)$ are supplied to the replicating lines Ri to prepare for the generation of the functions.

II Second step: Distribution of the functions for generation of $f(x_i)$ i. The contents of the lines $R_i$ are shifted to be replicated on the lines $b_i$ and $e_i$.

III Third step: Generation of $-f(x_i)$ i. The information on the lines $RR_i$ in the state 1 is shifted leftward to the associated lines $e_i$ to invert the contents of the lines $e_i$.

ii. The bubbles on the lines $e_1$ are consequently forced out to shift to the lines $d_i$. The bubbles on the lines $d_i$ are then cleared.

IV Fourth step: Shift to the region ADD i. The contents of the lines $b_i$ and the contents of the lines $e_i$ are simultaneously shifted upward to be set in the first region ADD.

V Fifth step: Addition i. The contents of the lines $e_i$ are shifted rightward to the lines $RR_{i+1}$.

ii. The contents of the lines $RR_{i+1}$ are added to the contents of the lines $b_{i+1}$ and the results are recorded on the lines $b_{i+1}$, thereby completing the differentiation.

Figure 13:
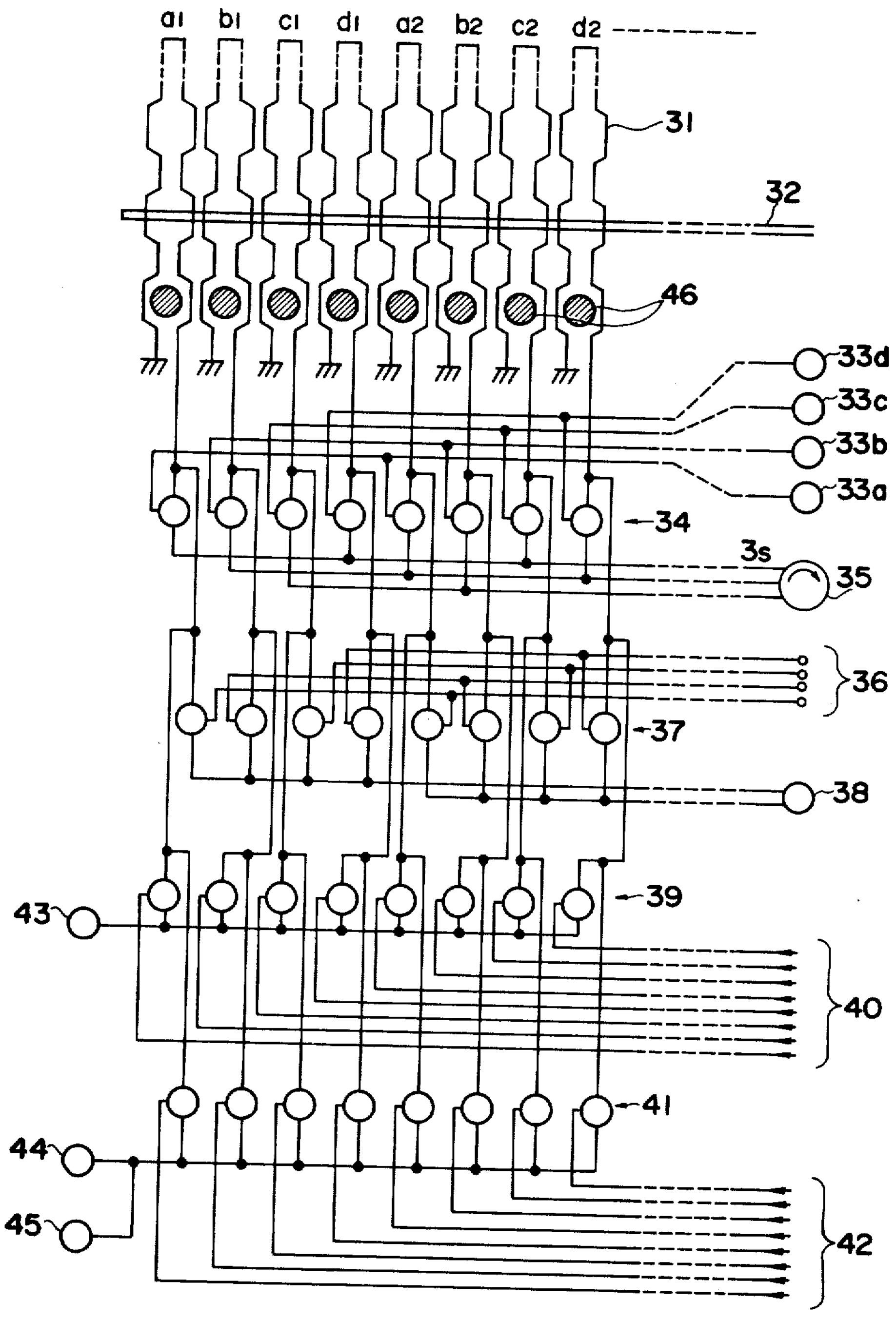
FIG. 13 is a schematic circuit diagram of a space integrator based on the principle shown in FIG. 11.
Figure 14A:
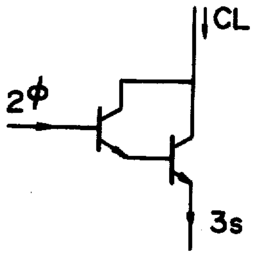
Figure 14B:
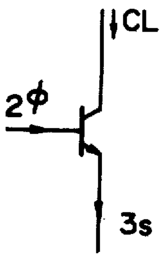

FIG. 13 is a schematic circuit diagram of an adder for carrying out the simultaneous parallel addition. Referring to FIG. 13, the reference numerals 31 and 32 designate operation lines and a replicating line respectively. Bubbles 46 are replicated by the replicating line in a number of times proportional to the number of sampling on a function $f(x)$ and are successively supplied to the operation lines 31. The reference numerals 35 and 34 designate a three-phase power supply and switching means connected to the power supply respectively. The switching means 34 may have structures as shown in FIGS. 14*a* and 14*b*. Switching means 37 for power supplied from a bubble locking bias power supply, switching means 39 for restricting the motion of bubbles during a shift in the $y$ direction, and switching means 41 for selectively restricting the replication, which will be described later, have a construction similar to that of the switching means 34. Switches 33*a* to 33*d* are provided to control the operation of the switching means 34. Similarly, switches 36 are provided for the on-off control of the switching means 37, and switches 40 are provided for the on-off control of the switching means 39. Further, switches 42 are provided for the on-off control of the switching means 41. These switches 33, 36, 40 and 42 are connected to the base of the transistors in the switching means 34, 36, 39 and 41 respectively. Thus, the switches 33, 36, 40 and 42 act to control the base voltage of the transistors in the respective switching means 34, 37, 39 and 41 thereby carrying out the on-off control of these switching means. The switching means 34, 37, and 39 are connected at the emitter of the transistors to the three-phase power supply 35, a main switch 38 and a main switch 43 respectively. The main switch 38 turns on and off the power supplied from the bias power supply for locking, the bubbles, and the main switch 43 turns on and off the power supplied from a power supply for restricting the movement of the bubbles during the shift in the $f(x)$ direction. The switching means 41 are connected at the emitter of the transistors to main switches 44 and 45. The main switch 44 turns on and off the current supplied from a power supply for restricting the replication, and the main switch 45 turns on and off the clearing current supplied from a power supply. The collectors of the corresponding transistors in the switching means 34, 37, 39 and 41 are connected to each other directly and to one end of the associated operation lines 31. The operation lines 31 are grounded at the other end.

The operation of the adder will now be described.

I Supply of signals to lines $a_1, c_1, a_2, \cdots. a_i, c_i, \cdots$.

i. The main switch 44 is turned on and the switches 42 for the switching means 41 associated with the lines $b_i$ and $d_i$ ($i = 1, 2, 3, \cdots$) are selectively turned on for controlling the replication.

ii. Simultaneously with the turn-on of the selective switches 42, current is supplied to the replicating line 32 thereby injecting necessary bubbles into the lines $a_i$ and $c_i$.

iii. The bubbles thus injected are shifted upward by one bit position. (The shifting circuit extends in the $y$ direction and is not shown in FIG. 13.)

iv. The steps (i) to (iii) are repeated three times further so as to obtain on the lines $a_i$ and $c_i$ the bubbles having the weights 1, 2, 4 and 8 as shown in FIG. 11.

II i. Addition

The switches 23*a*, 33*b*, 33*c* and 33*d* are selectively turned on so as to simultaneously apply a mobile field to the lines $a_i$, $b_i$, $c_i$ and $d_i$. The bitwise addition of the bubbles on the lines $a_i$ and $c_i$ is carried out and the results appear on the lines $a_i$.

ii. Resetting of lines $d_i$.

The main switch 45 is turned on and the switches 42 for the switching means 41 associated with the lines $d_i$ are selectively turned on thereby turning on the corresponding switching means 41 for clearing the bubbles on the lines $d_i$.

iii. Simultaneous shift of bubbles on the lines $b_i$.

The main switch 43 is turned on and the switches 40 for the switching means 39 associated with the lines $a_i$, $c_i$ and $d_i$ are selectively turned on so as to restrict the movement of the bubbles during the shift in the $f(x)$ direction. When the bubbles are shifted in the $f(x)$ direction in this state, the bubbles on the lines $b_i$ are solely shifted upward by one bit position, iv. The switches 33*b* and 33*c* are selectively actuated to produce a mobile field for applying this field in the direction of from the lines $b_i$ to the lines $c_i$. The bitwise addition of the bubbles on the lines $b_i$ and $c_i$ is carried out and the results appear on the lines $c_i$.

v. The steps (ii) to (iv) are repeated three times further.

III. Rightward shit of the results i. The contents of the lines $c_i$ are simultaneously shifted to the lines $a_{i+1}$. To do this, the switches 33*c*, 33*d* and 33*a* are turned on to apply a mobile field, and at the same time, the switches 36 for the switching means 37 associated with the lines $a_k$ ($k = 2i, = 1, 2, 3, \cdots$ ) are selectively turned on.

Figure 15:
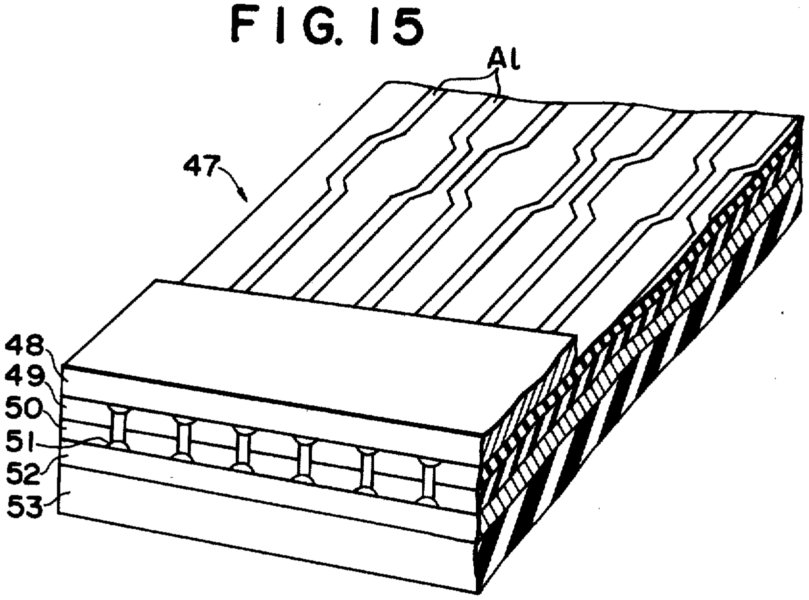
FIG. 15 is a perspective view showing a pratical structure of the space integrator shown in FIG. 13.

FIG. 15 is a perspective view showing a practical structural of the integrator schematically shown in FIG. 13. Referring to FIG. 15, the integrator designated generally by the reference numeral 47 includes a platelet or substrate 53 of material such as yttrium orthoaluminate which has a crystal structure and lattice constant similar to those of an orthoferrite. An orthoferrite layer 52 is grown on the substrate 53 and is connected to longitudinal electrodes and a group of switching means 48 by means of face down bonding 51. Electrically insulating layers 49 and 50 are interposed between the group of the switching means 48 and the orthoferrite layer 52. The insulating layer 49 insulates the switching means 48 from evaporated lateral electrodes of aluminum (not shown), while the insulating layer 50 insulates the orthoferrite layer 52 from the longitudinal electrodes.

While preferred embodiments of the present invention have been described in detail by way of illustration, the present invention is in on way limited to such specific embodiments and various changes and modifications may be made therein without departing from the spirit of the present invention.

We claim:

1. A magnetic bubble domain logical and arithmetic device comprising:

a sheet of a magnetic material, wherein cylindrical bubble domains are maintained at a predetermined size, when bias magnetic field of a predetermined strength is applied normal to the planar surface;

first means for uniformly applying bias magnetic field of the predetermined strength normal to the entire planar surface of said sheet;

second means for applying locally to respective regions of said sheet a reverse bias magnetic field of a predetermined strength in the reverse direction with respect to the direction of said uniformly applied bias magnetic field thereby establishing in said respective regions a trapping field having a magnetic strength lower than that of the uniformly applied bias magnetic field, so that the cylindrical bubble domains are retained within trapping regions by respective trapping fields, said second means forming a plurality of said trapping regions arranged adjacent to one another on the planar surface at such a distance that neighboring cylindrical bubble domains, disposed therein, are unstable because of the repulsion forces of neighboring domains to one another, said plurality of trapping regions forming at least one array of trapping regions;

third means for injecting cylindrical bubble domains, representative of information to be processed by logical operations, into said array of trapping regions;

fourth means shifting the cylindrical bubble domains in the array of trapping regions at a predetermined timing, said fourth means being connected to said array; and fifth means for deriving output binary coded information represented by the presence or absence of cylindrical bubble domains at predetermined positions in the array of trapping regions, whereby various kinds of logical operations are carried out.

2. A magnetic bubble domain logical and arithmetic device according to claim 1, wherein said fourth means comprises timing bubble injecting means for injecting timing cylindrical bubble domains at predetermined timings into a trapping region located at one end of the array, said third means operationally injects into said trapping region located at one end of the array a train of cylindrical bubble domains representing the information to be processed, said informational cylindrical bubble domains being serially injected between the injection of sequential timing bubbles, and said fifth means being disposed at the other end of said array of trapping regions so as to detect the presence or absence of a bubble forced out of said other end of the array, whereby a serial AND operation is carried out.

3. A magnetic bubble domain logical and arithmetic device according to claim 1, wherein said fourth means comprises timing bubble imjecting means for injecting timing cylindrical bubble domains at predetermined timings into a trapping region located at one end of said array, said third means comprises a plurality of bubble injecting means corresponding to respective trapping regions in said array, respectively, for injecting independently of one another cylindrical bubble domains into corresponding trapping regions depending on the information to be processed, said independent cylindrical bubble domains being parallelly injected between the injection of sequential timing bubbles, and said fifth means being disposed at the other end of the array of said trapping regions so as to detect the presence or absence of a bubble forced out of said other end of the array, whereby a parallel AND operation is carried out.

4. A magnetic bubble domain logical and arithmetic device according to claim 1, wherein said third means comprises imformation bubble injecting means corresponding to respective trapping regions of said array, respectively, for injecting cylindrical bubble domains representative of information to be processed into said corresponding trapping regions independently of each other, said fourth means comprises means for applying a mobile field onto the array from one end to the other end thereof, and said fifth means being disposed at the other end of the array so as to detect the presence or absence of a bubble in any of the trapping regions of the array forced out of said other end by the mobile field, whereby an OR operation is carried out.

5. A magnetic bubble domain logical and arithmetic device according to claim 4, wherein said fourth means further comprises clearing means for clearing the cylindrical bubble domains in said array of the trapping regions before commencing input of input information into the array by said third means, whereby OR operations are sequentially carried out.

6. A magnetic bubble domain logical and arithmetic device according to claim 1, wherein said fourth means includes clearing means for clearing bubbles from at least a part of the trapping regions of said array, whereby misoperation of the device is reduced.

7. A magnetic bubble domain logical and arithmetic device according to claim 1, wherein said trapping regions comprise an array of at least first, second and third trapping regions, said first, second and third trapping regions being adjacently disposed at distances such that neighboring cylindrical bubble domains, injected into said adjacent trapping regions, are unstable from repulsion forces generated by such two adjacent bubbles, said repulsion forces slightly exceeding the magnetic strength of the trapping field in respective trapping regions, said third means operationally repeatedly injects information bubbles into said first trapping region at a predetermined timing, and said fourth means includes means for applying a mobile field between the first and second trapping regions, said field capable of causing a bubble in the first trapping region to move into the second trapping region after information bubbles have been injected, and clearing means for clearing bubbles existing in the first and the third trapping regions at least at every second timing of said predetermined timing, whereby alternation of the presence and absence of a bubble in the second trapping region can be attained.

8. A magnetic bubble domain logical and arithmetic device according to claim 7, wherein said fifth means operationally detects the presence and absence of a bubble in the second trapping region.

9. A magnetic bubble domain logical and arithmetic device, according to claim 7, in which an adder is formed further comprising a plurality of said arrays of at least first, second and third trapping regions are arranged in a column, the respective arrays being representative of different stages in binary weights, said third means including means for injecting bubbles representative of an augend into the respective third trapping regions of the respective arrays, and means for injecting bubbles representative of an addend into the respective first trapping regions of the respective arrays after the bubbles representative of the augent have been injected, said fourth means further includes means for actuating said means for applying a mobile field between the first and second trapping regions in the respective arrays after bubbles representative of the addend have been injected, said clearing means of said fourth means operationally clearing a bubble existing in one of said first and third trapping regions of the respective stages of the arrays as a carry into the first region of the next higher stage of the arrays after the mobile field has been applied, whereby an addition operation is carried out.

10. A magnetic bubble domain logical and arithmetic device according to claim 9, in which a subtractor is formed, further comprising said means for injecting bubbles representative of an augend injects bubbles representative of a minuend, and said means for injecting bubbles representative of an addend injects bubbles representative of a subrahend, sixth means for converting said subtrahend into a complement thereof, said fourth means further including means for injecting a bubble into the first trapping region in response to the shift of a bubble from the highest stage of the array, whereby a subtraction operation is carried out.

11. A magnetic field bubble domain logical and arithmetic device according to claim 1, wherein an array of trapping regions is formed of at least first, second and third trapping regions having a distance between each said region which is selected to be such a small distance that the repulsion force generated by two bubbles coming into mutually adjacent trapping regions slightly exceeds the strength of the trapping fields of repective trapping regions, thereby excluding a bubble in each of mutually adjacent trapping regions, said third means operationally repeatedly injecting information bubbles into said first trapping region at a predetermined timing, and including at least one auxiliary trapping region formed by said second means for holding the repulsed bubbles, and said fourth means includes clearing means for clearing bubbles existing in the first and third trapping regions at least at every second timing of said predetermined timing, whereby alternation of the presence and the absence of bubbles in the second trapping region can be obtained.

12. A magnetic bubble domain logical and arithmetic device, comprising a plurality of adders, operatively connected to one another in stages, wherein each said adder comprises a sheet of magnetic material, wherein cylindrical bubble domains are maintained at a predetermined size, when a bias magnetic field of a predetermined strength is applied normal to the planar surface;

first means for uniformly applying a bias magnetic field of a predetermined strength normal to the entire planar surface of said sheet;

second means for applying locally to respective regions of said sheet a reverse bias magnetic field of a predetermined strength in the reverse direction with respect to the direction of said uniformly applied bias magnetic field thereby establishing in said respective regions a trapping field having a magnetic strength lower than that of the uniformly applied bias magnetic field, so that cylindrical bubble domains are retained within trapping regions by respective trapping fields, said second means forming a plurality of said trapping regions arranged adjacent to one another on the planar surface at such a distance that neighboring cylindrical bubble domains, disposed therein, are unstable because of the repulsion forces of neighboring domains to one another, said plurality of trapping regions forming at least one array of trapping regions of at least first, second and third trapping regions, said first, second and third trapping regions being adjacently disposed at distances such that cylindrical bubble domains, injected into said adjacent trapping regions, are unstable from repulsion forces generated by such two adjacent bubbles, said repulsion forces slighly exceeding the magnetic strength of the trapping field in respective trapping regions, wherein a plurality of said arrays of at least first, second and third trapping regions are arranged in a column, the respective arrays being representative of different stages in binary weights;

third means for injecting cylindrical bubble domains, representative of information to be processed by logical operations, into respective ones of said plurality of said arrays, said third means including means for injecting bubbles representative of an augend into the respective third trapping regions of the respective arrays, and means for injecting bubbles representative of an addend into the respective first trapping regions of the respective arrays after the bubbles representative of the augend have been injected;

fourth means shifting the cylindrical bubble domains in said respective arrays of trapping regions at a predetermined timing, said fourth means being connected to said respective arrays, and said fourth means further including means for applying a mobile field between the first and second trapping regions of respective arrays, said field capable of causing a bubble in the first trapping region to move into the second trapping region after information bubbles have been injected, and clearing means for clearing bubbles existing in the first and the third trapping regions at least at every second timing of said predetermined timing, whereby alternation of the presence and absence of a bubble in the second trapping region can be attained; and fifth means for deriving output binary coded information represented by the presence or absence of cylindrical bubble domains at a predetermined positions in respective arrays of trapping regions, whereby various kinds of logical operations are carried out;

wherein said fourth means further includes means for actuating said means for applying a mobile field between the first and second trapping regions in the respective arrays after bubbles representative of the addend have been injected, and said clearing means of said fourth means operationally clear a bubble existing in one of said first and third trapping regions of the respective stages of the arrays as a carry into the first region of the next higher stage of the arrays after the mobile field has been applied, whereby an addition operation is carried out; and wheren said third means of the respective adders operationally inject into the respective adders cylindrical bubble domains, representative of sampled information of a function of $x$ with a small difference $x$ in $x$ therebetween as augends, and cylindrical bubble domains representative of the augend of a next adjacent stage of the adders, as the addend thereof;

said third means repeatedly injecting bubbles representative of the results obtained from the respective adders into other adders of said plurality in the same manner until a single result is formed, whereby an integration operation is carried out.

13. A magnetic bubble domain logical and arithmetic device, comprising a plurality of subtractors, operatively connected to one another in stages, wherein each said subtractor comprises:

a sheet of a magnetic material, wherein cylindrical bubble domains are maintained at a predetermined size, when a bias magnetic field of a predetermined strength is applied normal to the planar surface;

first means for uniformly applying a bias magnetic field of the predetermined strength normal to the entire planar surface of said sheet;

second means for applying locally to respective regions of said sheet a reverse bias magnetic field of a predetermined strength in the reverse direction with respect to the direction of the uniformly applied bias magnetic field thereby establishing in said respective regions a trapping field having a magnetic strength lower than that of the uniformly applied bias magnetic field, so that cylindrical bubble domains are retained within trapping regions by respective trapping fields;

said second means forming a plurality of said trapping regions arranged adjacent to one antoehr on the planar surface at such a distance that neighhboring cylindrical bubble domains, disposed therein, are unstable because of the repulsion forces of neighboring domains to one another;

said plurality of trapping regions forming at least one array of trapping regions of at least first, second and third trapping regions, said first, second and third trapping regions being adjacently disposed at distances such that neighboring cylindrical bubble domains, injected into said adjacent trapping regions, are unstable from repulsion forces generated by such two adjacent bubbles, said repulsion forces slightly exceeding the magnetic strength of the trapping field in respective trapping regions, wherein a plurality of said arrays of at least first, second and third trapping regions are arranged in a column, the respective arrays being representative of different stages in binary weights;

third means for injecting cylindrical bubble domains, representative of information to be processed by logical operations, into respective ones of said arrays of trapping regions, said third means including means for injecting bubbles representative of a minuend into the respective second trapping regions of the respective arrays and means for injecting bubbles representative of a subtrahend into the respective first trapping regions of the respective arrays after the bubbles representative of the minuend have been injected, wherein means are futher provided for converting said subtrahend into a complement thereof;

fourth means shifting the cylindrical bubble domains into respective arrays of trapping regions at a predetermined timing, said fourth means being connected to said array and said fourth means including means for applying a mobile field between adjacent trapping regions, said field capable of causing a bubble in one trapping region to move into the adjacent trappping region after information bubbles have been injected, and clearing means for clearing bubbles existing in the first and third trapping regions at at least every second timing of said predetermined timing, whereby alternation of the presence and absence of a bubble in the second trapping region can be attained;

fifth means for deriving output binary coded information represented by the presence or absence of cylindrical bubble domains at predetermined positions in the array of trapping regions, wherein said fourth means further includes means for actuating said means for applying a mobile field between adjacent trapping regions in the respective arrays after bubbles representative of the subtrahend have been injected, said clearing means of said fourth means operationally clearing a bubble existing in one of said first and third trapping regions of the respective stages of the arrays as a carry into the first region of the next higher stage of the arrays after the mobile field has been applied, and, said fourth means further including means for injecting a bubble into the first trapping region in response to the shift of a bubble from the higher stage of the array, whereby a subtraction operation is carried out; and wherein said third means of the respective subtractors operationally injects into respective subtractors bubbles representative of the sampled values of a function of $x$ with a small difference $x$ in $x$ therebetween, such that a minuend in one stage of the subtractors is used as a subtrahend in the next adjacent stage of the subtractors, and said third means repeatedly injects into said subtractors bubbles representative of the results obtained from the preceding respective subtractors, as renewed information, in the same manner until a single result is formed, whereby a differentiation operation is carried out.

* * * * *